(12) United States Patent
Vogt

(10) Patent No.: US 10,031,802 B2
(45) Date of Patent: Jul. 24, 2018

(54) EMBEDDED ECC ADDRESS MAPPING

(71) Applicant: Intel Corporation, Santa Clara, CA (US)

(72) Inventor: Pete D. Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/930,600

(22) Filed: Jun. 28, 2013

(65) Prior Publication Data

US 2015/0006993 A1 Jan. 1, 2015

(51) Int. Cl.
*G06F 11/10* (2006.01)

(52) U.S. Cl.
CPC .................. *G06F 11/1052* (2013.01)

(58) Field of Classification Search
CPC .......... G06F 12/0862; G06F 9/383; G06F 2212/6028; G06F 2212/6026; G06F 12/0866
USPC ........................... 714/763; 711/137
See application file for complete search history.

(56) References Cited

U.S. PATENT DOCUMENTS

| 6,427,188 | B1* | 7/2002 | Lyon et al. ............. 711/122 |
| 6,467,048 | B1* | 10/2002 | Olarig et al. ............. 714/6.32 |
| 8,719,664 | B1* | 5/2014 | Chan et al. ............. 714/766 |
| 2004/0078524 | A1 | 4/2004 | Robinson |
| 2004/0088636 | A1 | 5/2004 | Cypher |
| 2004/0225943 | A1 | 11/2004 | Brueggen |
| 2005/0251629 | A1* | 11/2005 | Fahs et al. ............. 711/137 |
| 2006/0218467 | A1 | 9/2006 | Sibigtroth et al. |
| 2007/0061684 | A1* | 3/2007 | Rosenbluth ......... H03M 13/356 714/766 |
| 2008/0005646 | A1 | 1/2008 | Bains |
| 2010/0268984 | A1 | 10/2010 | Guthrie et al. |
| 2011/0320913 | A1* | 12/2011 | Stracovsky et al. ......... 714/763 |

(Continued)

FOREIGN PATENT DOCUMENTS

| CN | 1490730 A | 4/2004 |
| CN | 101558385 A | 10/2009 |
| CN | 103019963 A | 4/2013 |

(Continued)

OTHER PUBLICATIONS

Keeth et al., "DRAM Circuit Design: Fundamental and High-Speed Topics," IEEE Press Series on Microelectronic Systems. IEEE Press (2008), pp. 13-14.*

(Continued)

*Primary Examiner* — Kyle Vallecillo
(74) *Attorney, Agent, or Firm* — Thorpe North & Western, LLP

(57) ABSTRACT

Apparatus, systems, and methods to embed ECC data with cacheline data in a memory page are described. In one embodiment, an electronic device comprises a processor and a memory control logic to receive a request to read or write data to a memory device, wherein the data is mapped to a memory page comprising a plurality of cache lines, displace at least a portion of the plurality of cache lines to embed error correction code information with the data, and remap the portion of the plurality of cache lines to another memory location, and retrieve or store the data and the error correction code information on the memory page. Other embodiments are also disclosed and claimed.

22 Claims, 11 Drawing Sheets

(56) References Cited

U.S. PATENT DOCUMENTS

2012/0278651 A1* 11/2012 Muralimanohar et al. .. 714/6.11
2014/0229797 A1* 8/2014 Agrawal et al. ............. 714/766

FOREIGN PATENT DOCUMENTS

| JP | 2010-262537 | 11/2010 |
| KR | 10-2007-0087176 | 8/2007 |
| RU | 2349955 C2 | 3/2009 |
| WO | 2010/022270 A2 | 2/2010 |
| WO | 2014/209936 A1 | 12/2014 |

OTHER PUBLICATIONS

International Search Report received for PCT Application No. PCT/US2014/043766, dated Oct. 14, 2014, 3 pages.

* cited by examiner

EMBEDDED ECC ADDRESS MAPPING

FIELD

The present disclosure generally relates to the field of electronics. More particularly, some embodiments of the invention generally relate to embedded Error Correction Code (ECC) address mapping.

BACKGROUND

Various electronic devices may incorporate memory technology. The use of memory in some electronic devices, e.g., smart phones and tablets, drives high volume, but these are cost sensitive applications in which the overhead of adding error correction code (ECC) bits to the memory is not acceptable. High volume devices may be useful in other markets for electronic devices, e.g., in the server product space. However, such markets require consistently high reliability from memory devices, which necessitates ECC features in memory devices.

Accordingly, techniques to implement ECC in high volume memory devices may find utility.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Described herein are techniques to map ECC bits into a portion of a memory device (e.g., a dynamic random access memory (DRAM) device) which does not include dedicated ECC capacity. In various embodiments the ECC bits for any given cacheline may be located in the same DRAM page (or row) as the cacheline. This allows a common DRAM activation command to be used for both the cacheline data and the ECC data accesses, thereby saving power and reducing latency. The arrangement of the ECC data in the page may be arranged to increase page hit rates that might share the same block of ECC data bits read for the first cacheline. Further, cachelines that are displaced to make room for the ECC data bits are relocated to an alternative DRAM page, along with the ECC data bits needed to protect the displaced cacheline.

In some embodiments blocks of cachelines may be mapped into the DRAM physical space such that, when used in conjunction with a memory controller, allows standby power to be reduced. If the data needed to support low power modes can be allocated into a small portion of the DRAM then it is possible to put the remainder of the DRAM into a powered off like state using Partial Array Self Refresh (PASR) techniques.

The techniques discussed herein may be provided in various electronic devices (e.g., including servers, desktops, notebooks, smart phones, tablets, portable game consoles, etc.) which may include a memory system comprising multiple DRAM chips commonly assembled into a dual in-line memory module (DIMM). In some embodiments logic may be implemented in a memory controller which is to be integrated into an electronic device. Alternatively, logic may be implemented at the DIMM level to control operations for multiple DRAMs in a DIMM.

Figure 1:
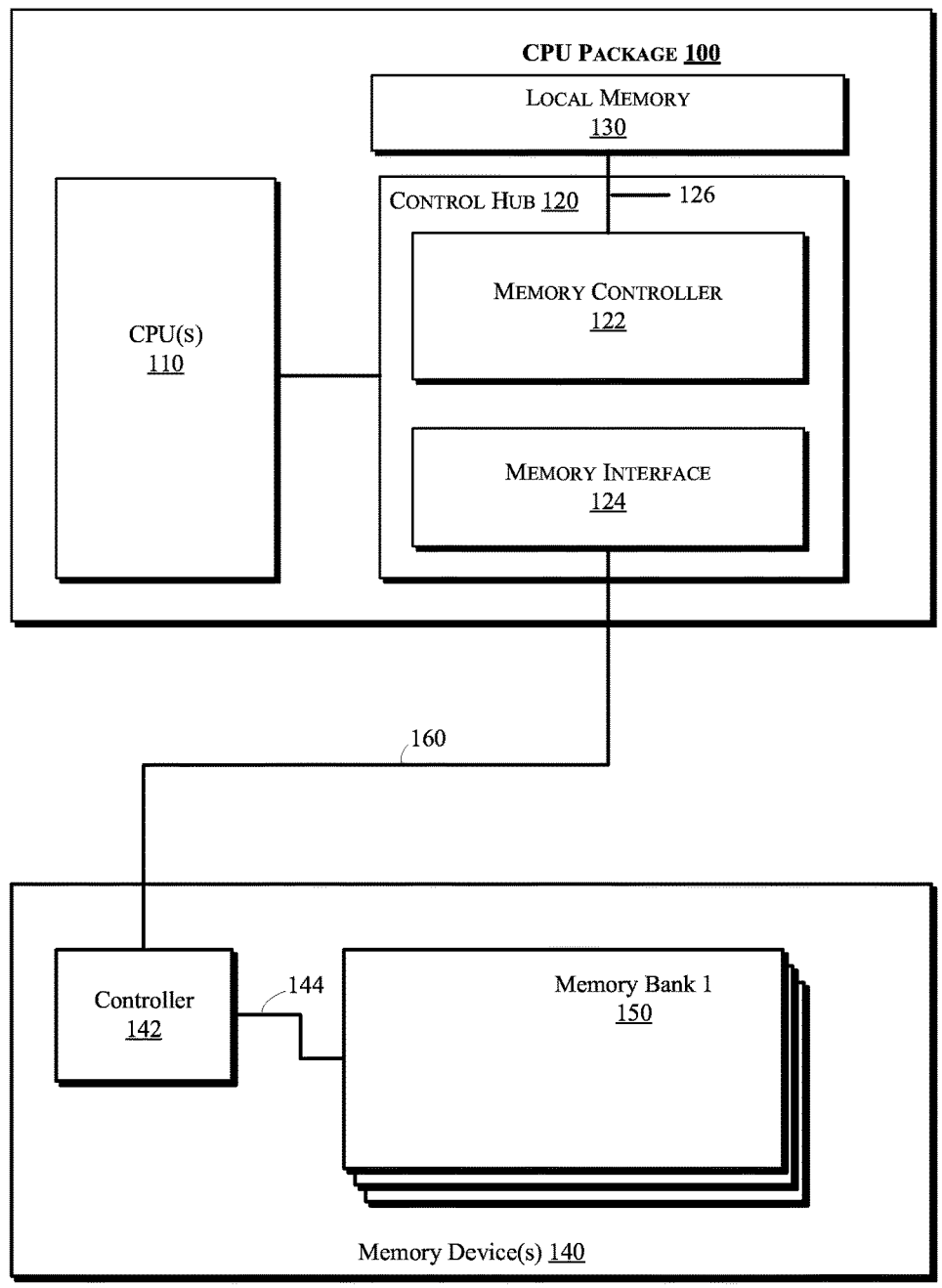
FIG. 1 is a schematic, block diagram illustration of components of apparatus to implement embedded ECC address mapping in accordance with various embodiments discussed herein.

FIG. 1 is a schematic, block diagram illustration of components of electronic device which may be adapted to implement embedded ECC address mapping in accordance with various embodiments discussed herein. Referring to FIG. 1, in some embodiments a central processing unit (CPU) package 100 which may comprise one or more CPUs 110 coupled to a control hub 120. Control hub 120 comprises a memory controller 122 and a memory interface 124. Memory Controller 122 is coupled through bus 120 to local memory 130.

Memory interface 124 is coupled to one or more remote memory devices 140 by a communication bus 160. Memory device 140 may comprise a controller 142 and one or more memory banks 150. In various embodiments, memory banks 150 may be implemented using one or more direct in-line memory modules (DIMMs) coupled to a memory channel 144 which provides a communication link to controller 142. The specific configuration of the memory bank(s) 150 in the memory device(s) 140 is not critical.

Figure 2A:
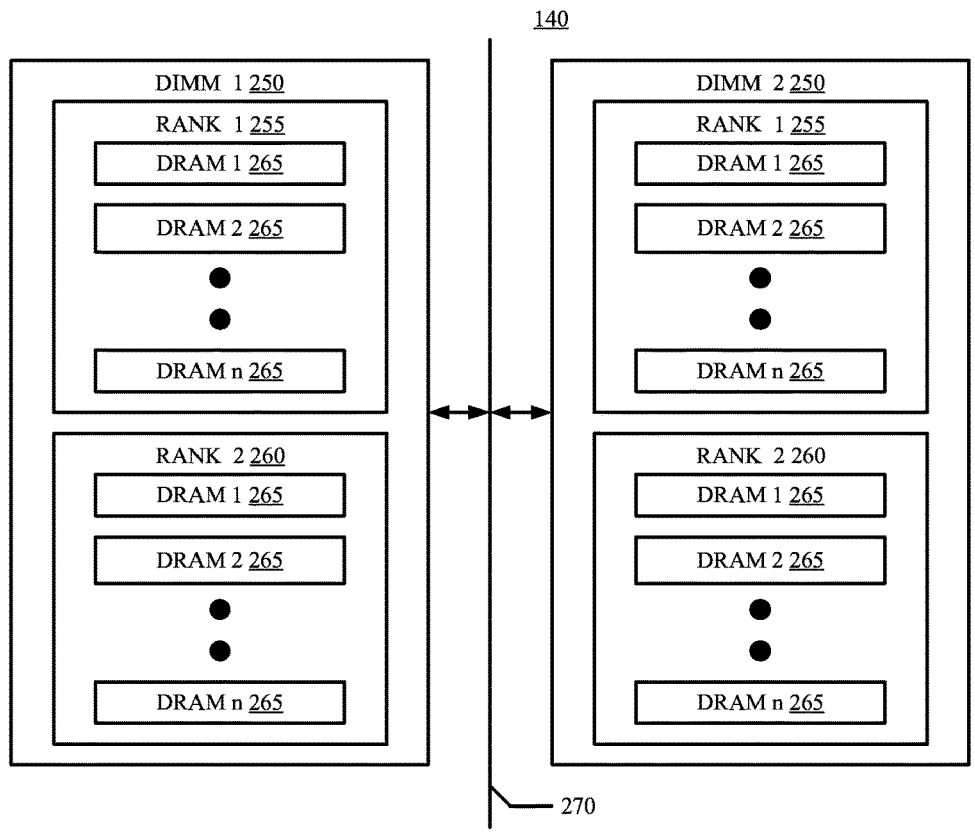
FIG. 2A is a schematic, block diagram of an exemplary memory which may be adapted to implement embedded ECC address mapping in accordance with various embodiments discussed herein.

In various embodiments, memory device(s) 140 may be implemented as a memory system using one or more DRAM memory modules. FIG. 2A is a schematic, block diagram of an exemplary memory device(s) 140 which may be adapted to implement ECC memory management in accordance with various embodiments discussed herein. Referring to FIG. 2A, in some embodiments the memory device(s) 140 may comprise one or more direct in-line memory modules (DIMMs) 250 coupled to a memory channel 270 which provides a communication link to memory controller 142. In the embodiment depicted in FIG. 2A each DIMM comprises a first rank 255 and a second rank 260, each of which includes a plurality of DRAM modules 265. One skilled in the art will recognize that memory device(s) 140 may comprise more or fewer DIMMs 250, and more or fewer ranks per DIMM. Further, some electronic devices (e.g., smart phones, tablet computers, and the like) may comprise simpler memory systems comprised of one or more DRAMs.

Figure 2B:
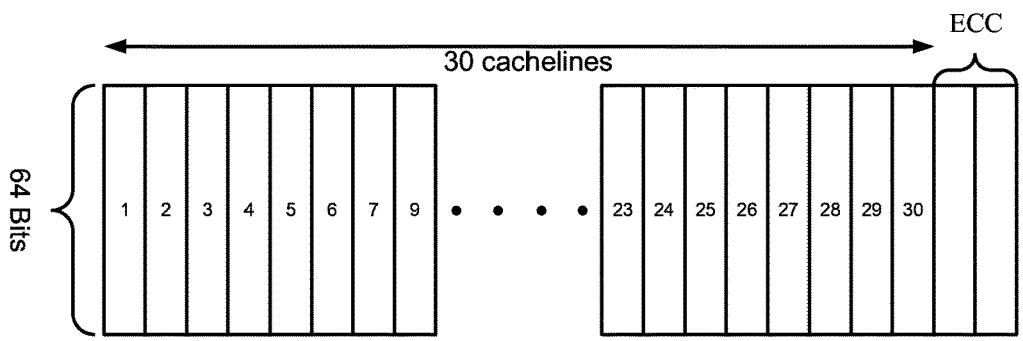
FIG. 2B is a schematic illustration of a memory page in accordance with various embodiments discussed herein.

FIG. 2B is a schematic illustration of a page of memory which may be stored in a DRAM 265. In some embodiments each 2048B page of memory holds 30 cachelines of data, each of which is 64 bytes and 4B of ECC data per cacheline. Thus, 1920B of the 2048B are used for data, with the remainder being allocated to ECC data and metadata. In some embodiments the ECC data is stored at the end of the page, as illustrated in FIG. 2B.

In some embodiments the 64B cacheline and 32B of ECC data may be delivered across the same data channel. A burst length of BL8 may be used to read the cacheline, while BL4 may be used to read ECC data.

Figure 3:
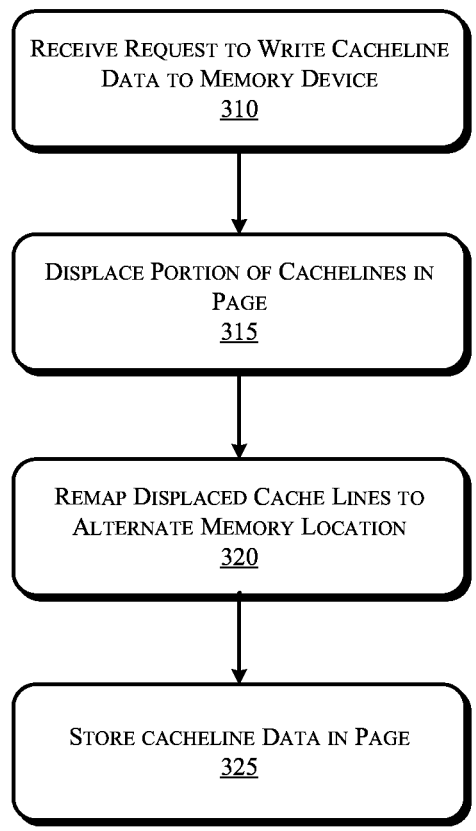
FIGS. 3-4 are flowchart illustrating operations in a method to implement embedded ECC address mapping in accordance with various embodiments discussed herein.

As described above, in some embodiments at least one of the memory controller 122 or the controller 142 in the memory device(s) 140 includes logic to implement embedded ECC address mapping operations. ECC address mapping operations implemented by memory controller 122 and/or controller 142 will be described with reference to FIGS. 3-5. FIG. 3 illustrates cacheline write operations which may be implemented by at least one of the memory controller 122 or the controller 142 in the memory device(s) 140 to implement embedded ECC address mapping. Other operations such as cacheline read, ECC write and ECC read have similar flows. Referring to FIG. 3, at operation 310 the memory controller 122 or the controller 142 receives a request to write cacheline data to local memory 130 or a page of the memory device 140.

Figure 2C:
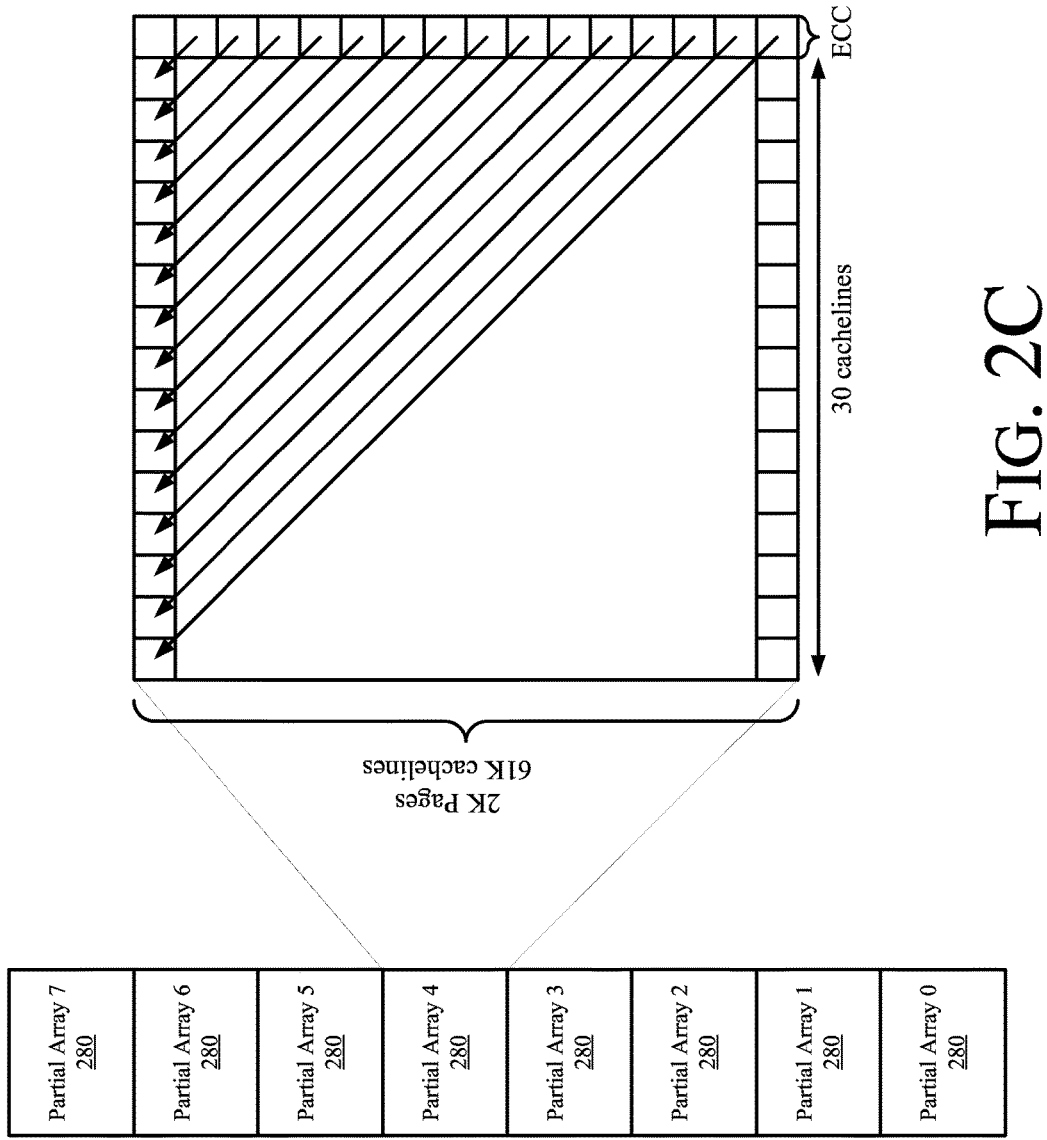
FIG. 2C is a schematic illustration of a memory mapping scheme in accordance with various embodiments discussed herein

At operation 320 the displaced cache lines are remapped to an alternate memory location. Referring to FIG. 2C, in some embodiments the memory device is partitioned into a plurality of partial arrays 280 and the displaced cachelines are remapped to the top of the partial array to which the write operation is directed. At operation 325 the cacheline data are stored in the page of memory.

As illustrated in FIG. 2C, the resulting memory is structured such that each partial array includes both data and all the ECC information necessary to protect the data in the partial array. Thus, each partial array may be placed into a low power state independently using partial array self refresh (PASR) logic, thereby reducing power consumption by the memory device 140.

Figure 4:
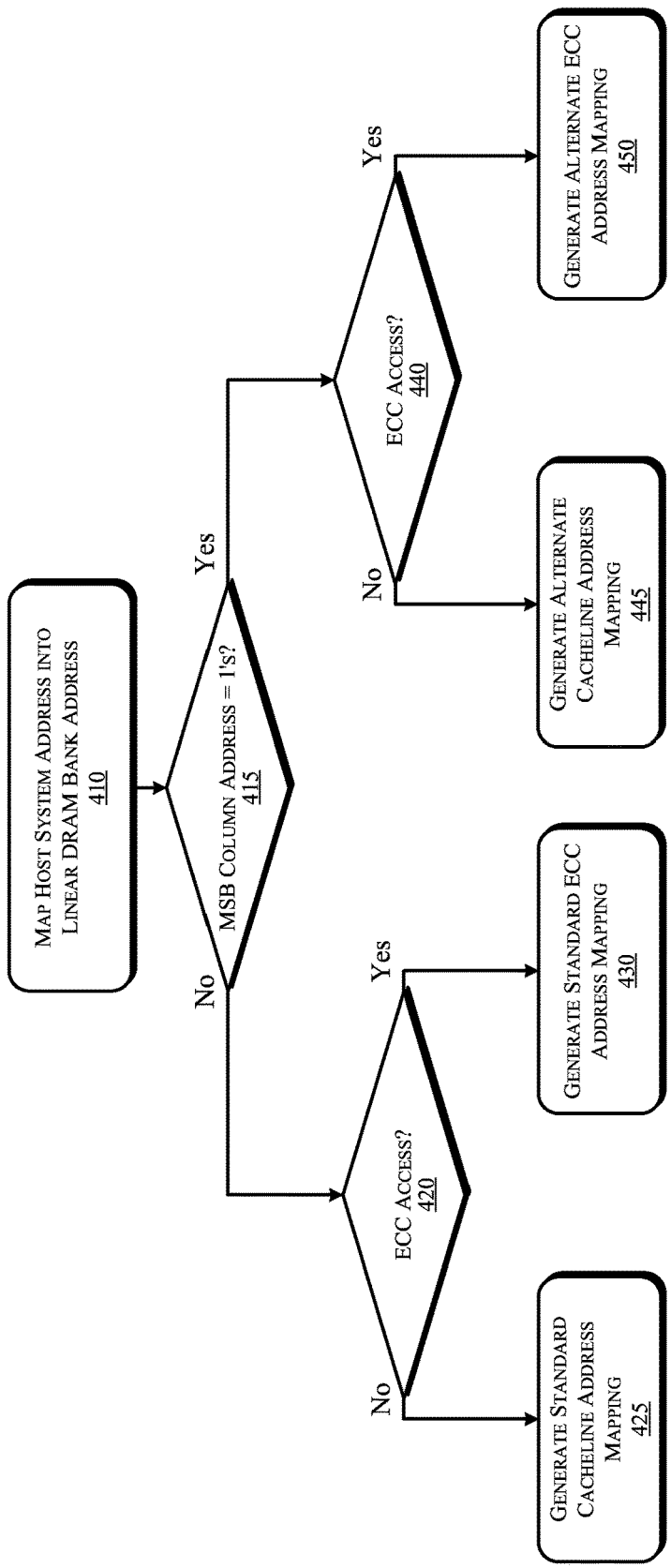
Figure 5:
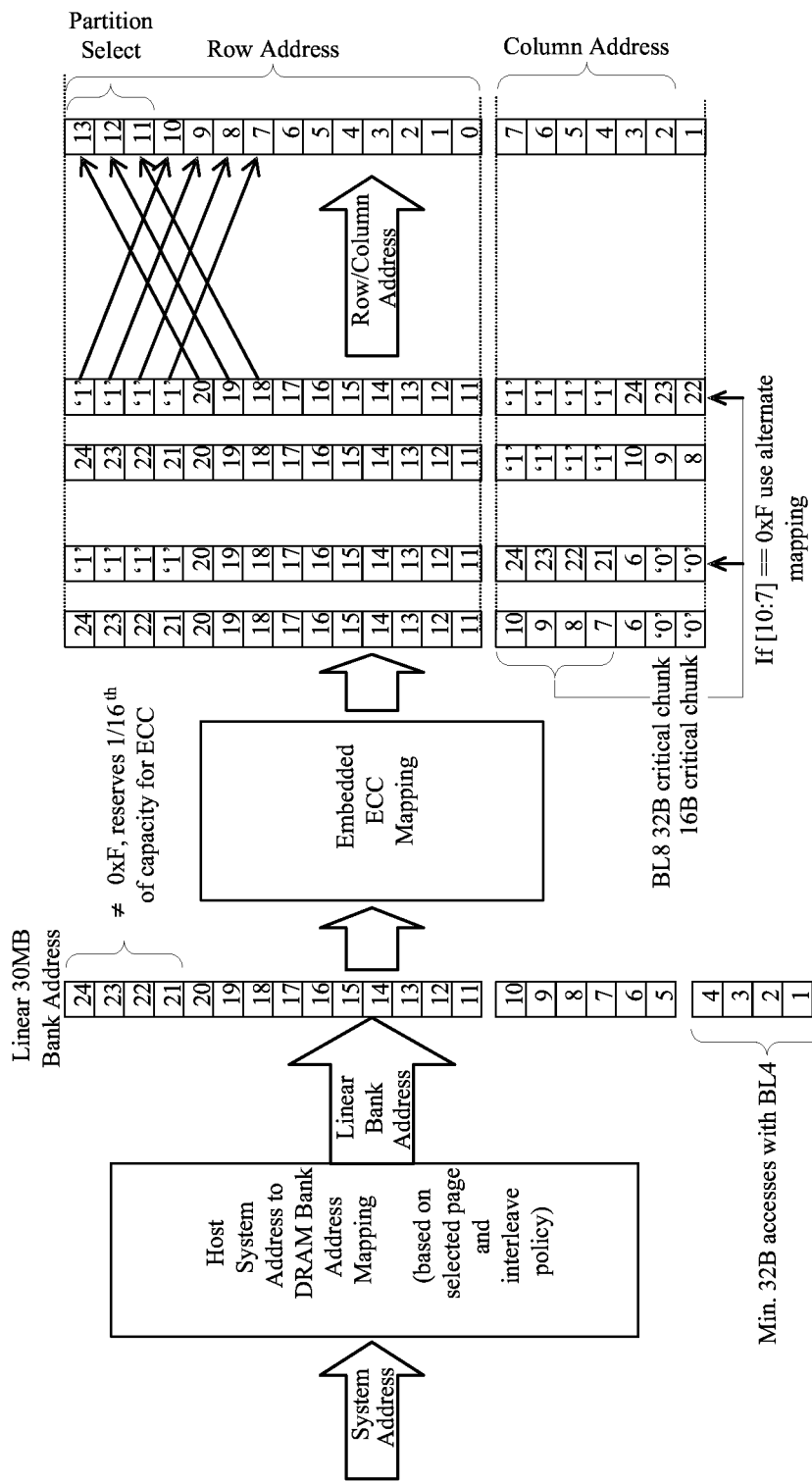
FIG. 5 is a schematic illustration of a memory mapping scheme for embedded ECC address mapping in accordance with various embodiments discussed herein.

Further aspects of memory mapping operations are described with reference to FIGS. 4-5. Referring to FIGS. 4-5, when a memory access request arrives the host system address is mapped to a DRAM linear bank address map based on the selected page and on an interleave policy.

If, at operation 415 the most significant bits of the column address are not all ones then standard address mapping will be applies and control passes to operation 420. If at operation 420 the request is for cacheline access then control passes to operation 425 and standard cacheline mapping is applied. By contrast, if at operation 420 the memory request is for ECC access then control passes to operation 430 and standard ECC addressing is generated.

Referring back to operation 415, if the most significant bits of the linear bank address are all ones, then alternative mapping will be applied and control passes to operation 440.

If at operation 440 the memory request is for cacheline access then control passes to operation 445 and alternate cacheline mapping is applied. By contrast, if at operation 440 the memory request is for ECC access then control passes to operation 450 and alternate ECC addressing is generated.

FIG. 5 illustrates a specific embodiment for a memory device with a 2048B page size and 8 partitions. In this example the most significant 4 column address bits are used to determine if the cacheline or ECC access will use standard or alternative mapping. This illustration also shows the standard and alternative mapping for cacheline accesses and ECC accesses. This illustration further shows how the standard and alternatively mapped addresses are manipulated to locate one of eight blocks of cachelines with associated ECC into one of eight DRAM partitions. In this example the most significant three bits of the row address are used by the DRAM to select a partition.

Figure 6:
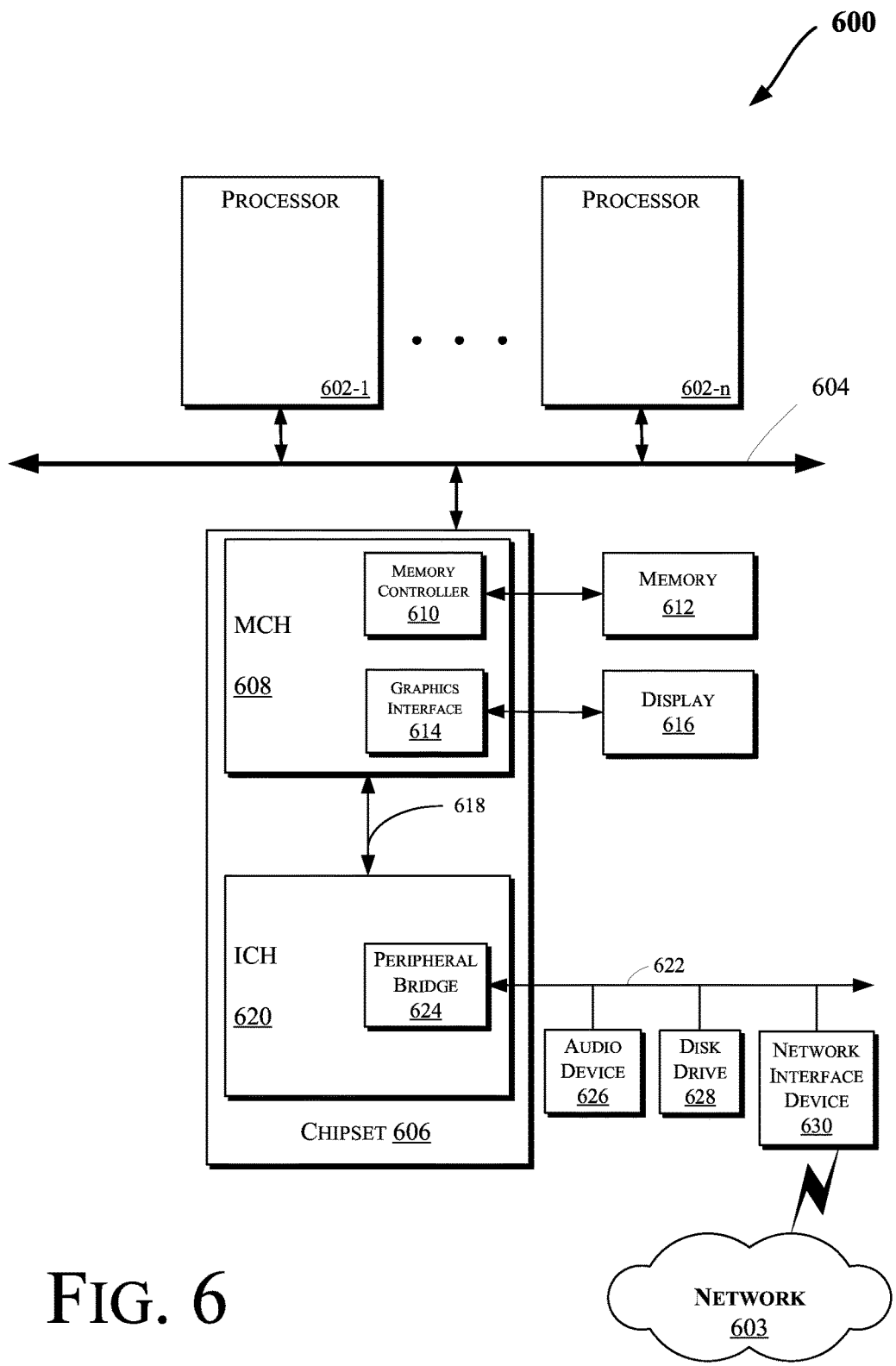
FIGS. 6-10 are schematic, block diagram illustrations of electronic devices which may be adapted to implement ECC memory management in accordance with various embodiments discussed herein.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
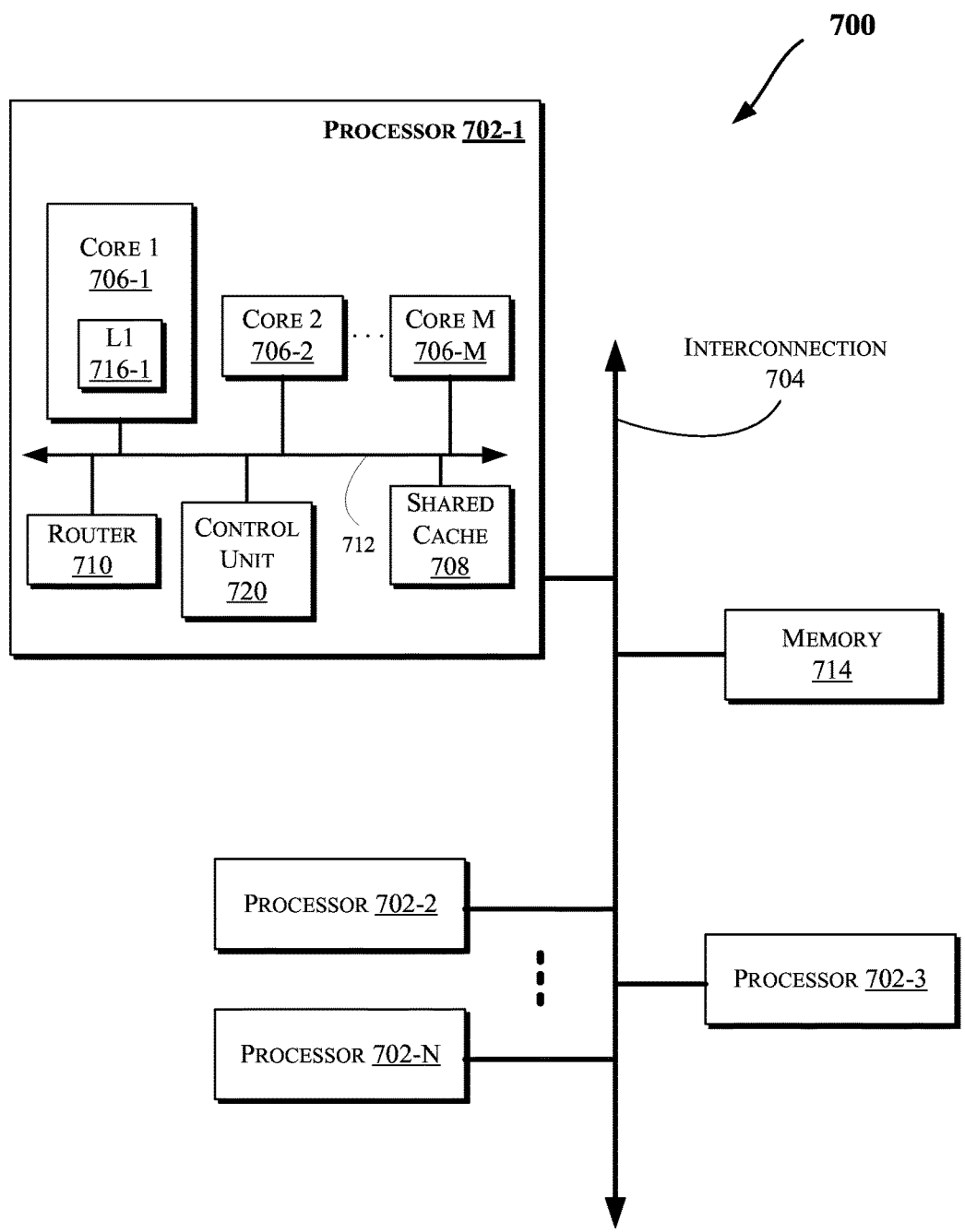

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
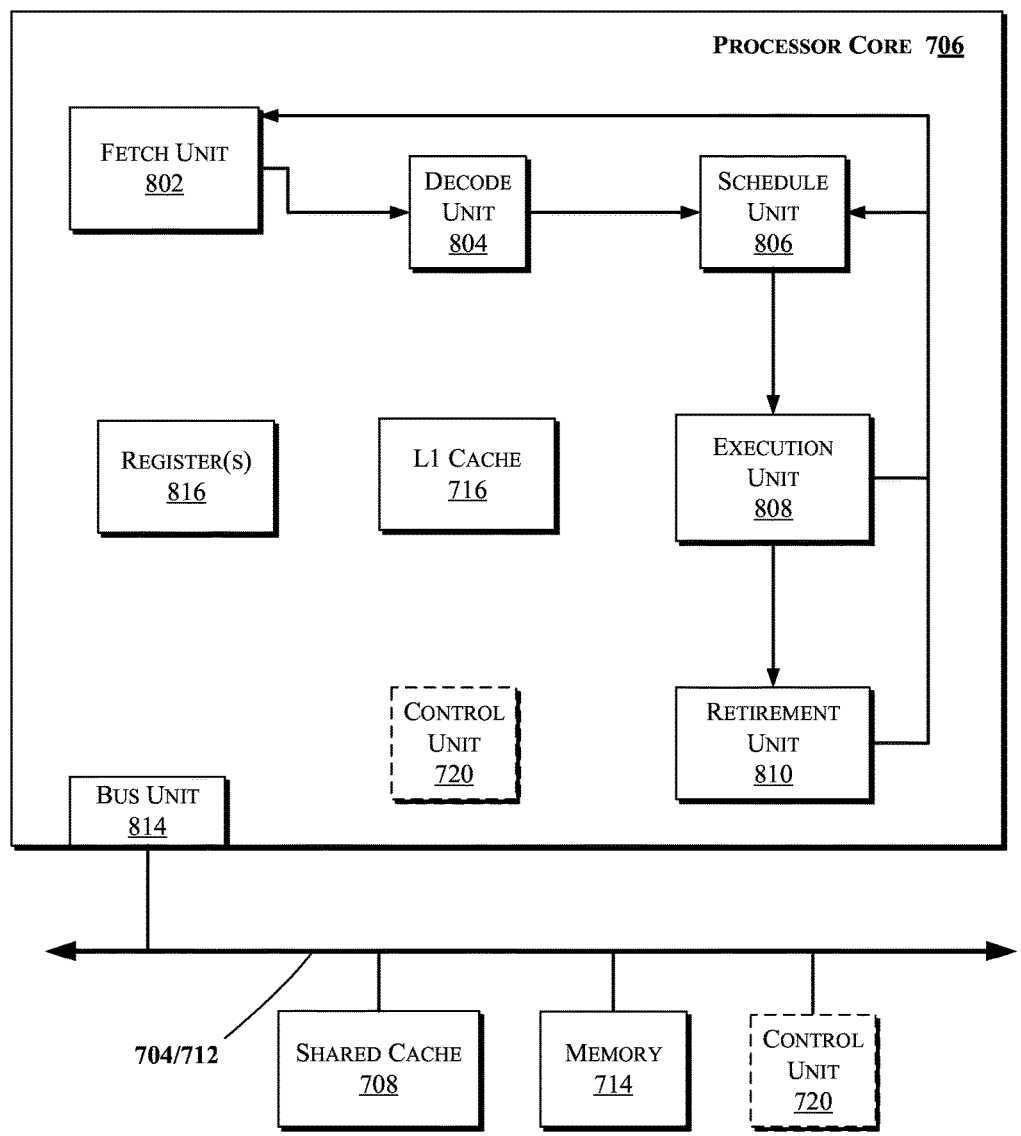

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/ or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
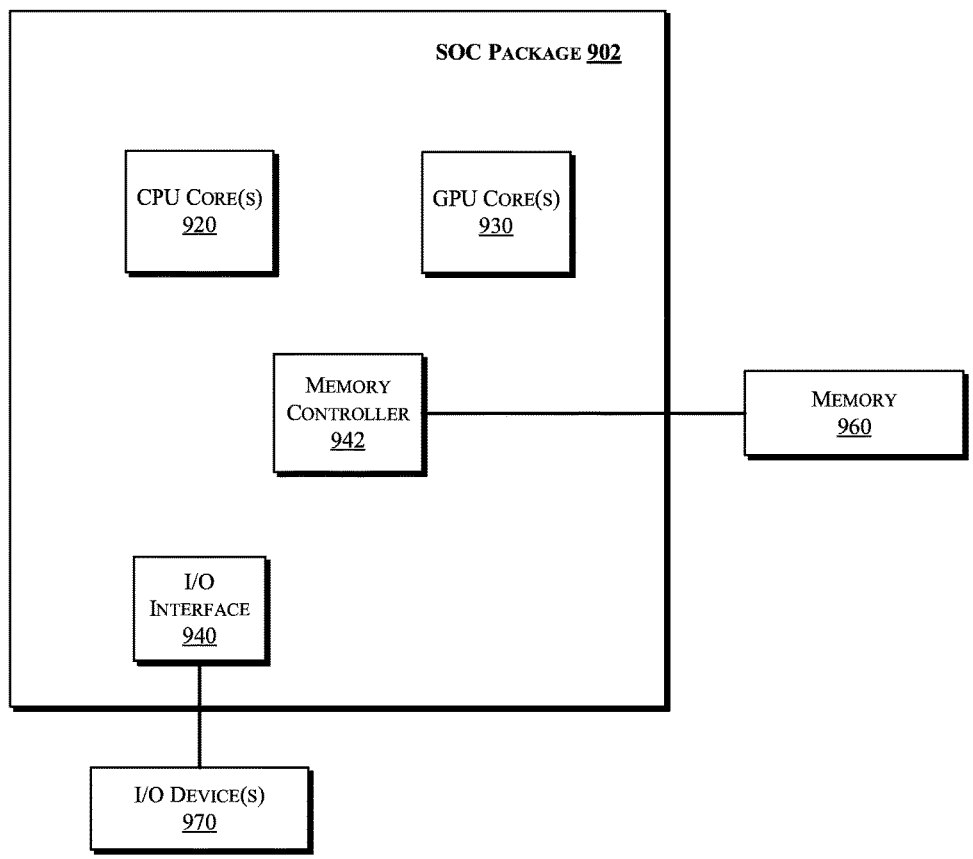

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
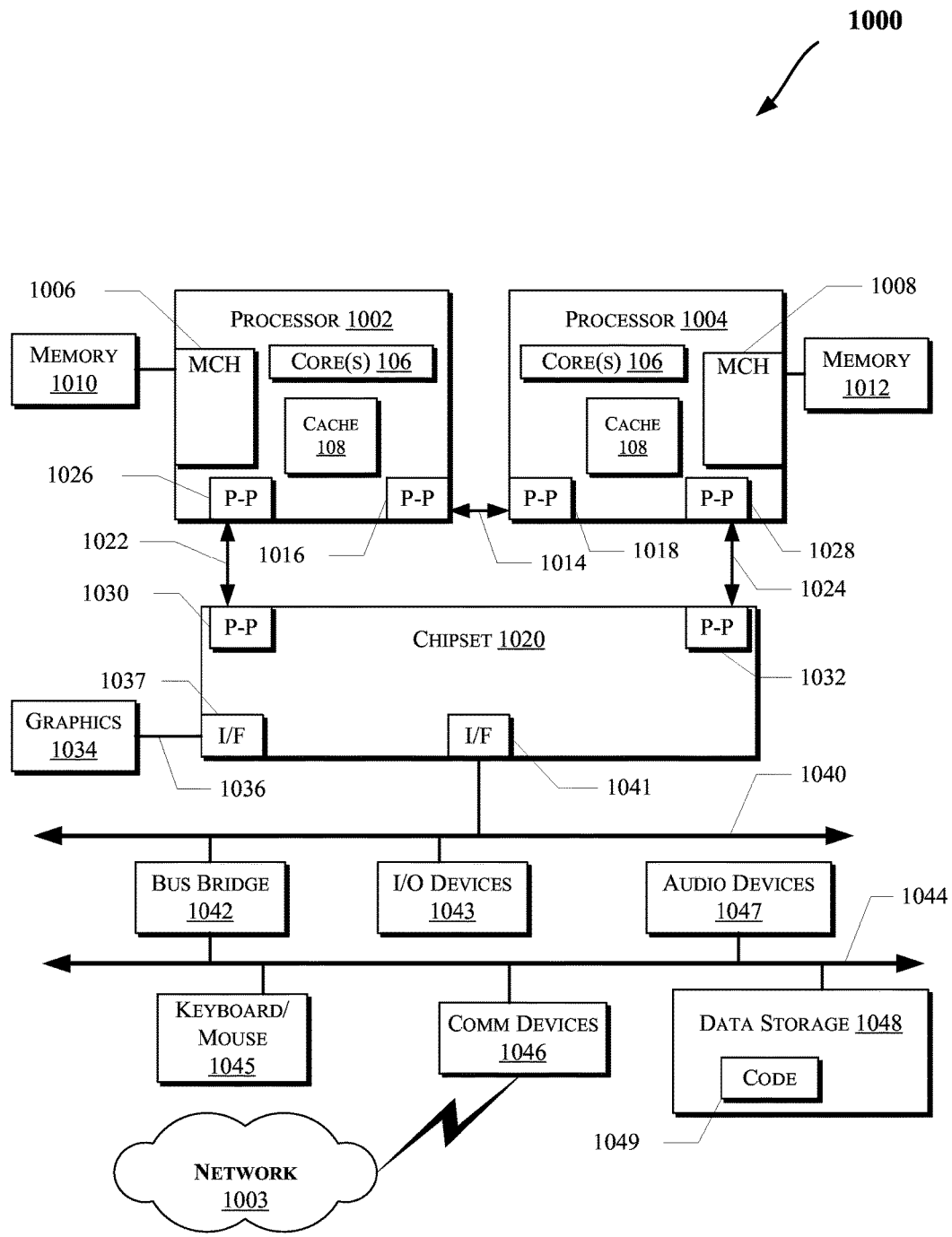

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following examples pertain to further embodiments.

Example 1 is an electronic device comprising a processor and a memory control logic to receive a request to access data on a memory device, wherein the data is mapped to a memory page comprising a plurality of cache lines, displace at least a portion of the plurality of cache lines to embed error correction code information with the data, remap the portion of the plurality of cache lines to another memory location, and access the data and the error correction code information on the memory page.

In Example 2, the subject matter of Example 1 can optionally include a data bus, wherein the data and the error correction code information are transmitted on the data bus.

In Example 3, the subject matter of any one of Examples 1-2 can optionally include logic to remap error correction code information associated with the plurality of cache lines to another memory location.

In Example 4, the subject matter of any one of Examples 1-3 may be arranged such that the memory device is partitioned into a plurality of partial arrays and the write request is directed to a selected partial array, and further comprising logic to remap the portion of the plurality of cache lines to a predetermined location in the selected partial array.

In Example 5, the subject matter of any one of Examples 1-4 may be arranged such that the predetermined location corresponds to a top section of the selected partial array.

In Example 6, the subject matter of any one of Examples 1-3 can optionally include logic to cut power to the selected partial array.

In Example 7, the subject matter of any one of Examples 1-6 may be arranged such that the request to access data on the memory device is a write request and the data and the error correction code are stored on the same memory page.

In Example 8, the subject matter of any one of Examples 1-6 may be arranged such that the request to access data on the memory device is a read request and the data and the error correction code are retrieved from the same memory page.

Example 9 is a memory controller comprising logic to receive a request to access data on a memory device, wherein the data is mapped to a memory page comprising a plurality of cache lines, displace at least a portion of the plurality of cache lines to embed error correction code information with the data, remap the portion of the plurality of cache lines to another memory location and access the data and the error correction code information on the memory page.

In Example 10, the subject matter of Example 9 can optionally include a data bus, wherein the data and the error correction code information are transmitted on the data bus.

In Example 11, the subject matter of any one of Examples 9-10 can optionally include logic to remap error correction code information associated with the plurality of cache lines to another memory location.

In Example 12, the subject matter of any one of Examples 9-11 may be arranged such that the memory device is partitioned into a plurality of partial arrays and the write request is directed to a selected partial array, and further comprising logic to remap the portion of the plurality of cache lines to a predetermined location in the selected partial array.

In Example 13, the subject matter of any one of Examples 9-12 may be arranged such that the predetermined location corresponds to a top section of the selected partial array.

In Example 14, the subject matter of any one of Examples 9-13 can optionally include logic to cut power to the selected partial array.

In Example 15, the subject matter of any one of Examples 9-14 may be arranged such that the request to access data on the memory device is a write request and the data and the error correction code are stored on the same memory page.

In Example 16, the subject matter of any one of Examples 9-15 may be arranged such that the request to access data on the memory device is a read request and the data and the error correction code are retrieved from the same memory page.

Example 17 is an apparatus comprising a memory device having one or more memory cells, a memory control logic to receive a request to access data on a memory device, wherein the data is mapped to a memory page comprising a plurality of cache lines, displace at least a portion of the plurality of cache lines to embed error correction code information with the data, remap the portion of the plurality of cache lines to another memory location, and access the data and the error correction code information on the memory page.

In Example 18, the subject matter of Example 17 can optionally include a data bus, wherein the data and the error correction code information are transmitted on the data bus.

In Example 19, the subject matter of any one of Examples 17-18 can optionally include logic to remap error correction code information associated with the plurality of cache lines to another memory location.

In Example 20, the subject matter of any one of Examples 17-19 may be arranged such that the memory device is partitioned into a plurality of partial arrays and the write request is directed to a selected partial array, and further comprising logic to remap the portion of the plurality of cache lines to a predetermined location in the selected partial array.

In Example 21, the subject matter of any one of Examples 17-20 may be arranged such that the predetermined location corresponds to a top section of the selected partial array.

In Example 22, the subject matter of any one of Examples 17-21 can optionally include logic to cut power to the selected partial array.

In Example 23, the subject matter of any one of Examples 17-22 may be arranged such that the request to access data on the memory device is a write request and the data and the error correction code are stored on the same memory page.

In Example 24, the subject matter of any one of Examples 17-23 may be arranged such that the request to access data on the memory device is a read request and the data and the error correction code are retrieved from the same memory page.

Example 25 is a processor-based method to map data to a memory device, comprising receiving, in a processing device, a request to access data on a memory device, wherein the data is mapped to a memory page comprising a plurality of cache lines, displacing at least a portion of the plurality of cache lines to embed error correction code information with the data, remapping the portion of the plurality of cache lines to another memory location, and accessing the data and the error correction code information on the memory page.

In example 26, the data and the error correction code information of example 25 are transmitted together on a single data bus.

In Example 27, the subject matter of any one of Examples 25-26 can optionally include remapping error correction code information associated with the plurality of cache lines to another memory location.

In Example 28, the subject matter of any one of Examples 25-27 can optionally include an arrangement in which the memory device is partitioned into a plurality of partial arrays, and the write request is directed to a selected partial array and further comprising remapping the portion of the plurality of cache lines to a predetermined location in the selected partial array.

In Example 29 the subject matter of any one of Examples 25-28 can optionally include an arrangement in which the predetermined location corresponds to a top section of the selected partial array.

In Example 30, the subject matter of any one of Examples 25-27 can optionally include cutting power to the selected partial array.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An electronic device comprising:
 a processor; and
 a memory control logic in electrical communication with the processor using an interconnection network and adapted to:
  receive a write request from the processor over an interconnection network to write a cache line of data to a memory device in electrical communication with the memory control logic using a communication bus, wherein the cache line of data is mapped to a memory page of the memory device comprising a plurality of cache lines and is partitioned into a plurality of partial arrays;
  displace at least a portion of the plurality of cache lines in the memory page to embed error correction code information for the cache line of data;
  remap the displaced portion of the plurality of cache lines to another memory location at the top of a partial array to which the write request is directed; and
  write, to the memory device using the communication bus, the cache line of data and the error correction code information for the cache line of data to the memory page at a location to allow a common memory activation command to retrieve both the cache line of data and the error correction code information for the cache line of data, to thus reduce latency and power use.

2. The electronic device of claim 1, further comprising logic to remap error correction code information associated with the plurality of cache lines to another memory location.

3. The electronic device of claim 1, further comprising logic to:
 receive a memory access request directed to the memory page, wherein the memory access request comprises a column address; and
 apply a first mapping policy when a plurality of most significant bits in the column address all hold a value of one (1).

4. The electronic device of claim 3, further comprising logic to:
 apply a second mapping policy when a plurality of most significant bits in the column address do not all hold a value of one (1).

5. The electronic device of claim 1, further comprising logic to cut power to at least one of the plurality of partial arrays, wherein each of the plurality of partial arrays includes an independent low power state.

6. The electronic device of claim 3, wherein:
 the memory access request to access data on the memory device is a write request; and
 the data and the error correction code information are stored on the same memory page.

7. The electronic device of claim 3, wherein:
 the memory access request to access data on the memory device is a read request, and
 the data and the error correction code information are retrieved from the same memory page.

8. A memory controller comprising logic to:
 receive a write request, from a processor in electrical communication with the logic using an interconnection network, to write a cache line of data to a memory device in electrical communication with the logic using a communication bus, wherein the cache line of data is mapped to a memory page of the memory device comprising a plurality of cache lines and is partitioned into a plurality of partial arrays;
 displace at least a portion of the plurality of cache lines in the memory page to embed error correction code information for the cache line of data;
 remap the displaced portion of the plurality of cache lines to another memory location at the top of a partial array to which the write request is directed; and
 write, to the memory device using the communication bus, the cache line of data and the error correction code information for the cache line of data to the memory page at a location to allow a common memory activation command to retrieve both the cache line of data and the error correction code information for the cache line of data, to thus reduce latency and power use.

9. The memory controller of claim 8, further comprising logic to remap error correction code information associated with the plurality of cache lines to another memory location.

10. The memory controller of claim 8, further comprising logic to:
 receive a memory access request directed to the memory page, wherein the memory access request comprises a column address; and
 apply a first mapping policy when a plurality of most significant bits in the column address all hold a value of one (1).

11. The memory controller of claim 10, further comprising logic to:
 apply a second mapping policy when a plurality of most significant bits in the column address do not all hold a value of one (1).

12. The memory controller of claim 8, further comprising logic to cut power to at least one of the plurality of partial arrays, wherein each of the plurality of partial arrays includes an independent low power state.

13. The memory controller of claim 10, wherein:
 the memory access request to access data on the memory device is a write request; and
 the data and the error correction code information are stored on the same memory page.

14. The memory controller of claim 10, wherein:
 the memory access request to access data on the memory device is a read request; and
 the data and the error correction information code are retrieved from the same memory page.

15. An apparatus comprising:
 a memory device having one or more memory cells; and
 a memory control logic in electrical communication with the memory device using a communication bus and adapted to:

receive a write request, from a processor in electrical communication with the memory control logic using an interconnection network, to write a cache line of data to the memory device, wherein the cache line of data is mapped to a memory page of the memory device comprising a plurality of cache lines and is partitioned into a plurality of partial arrays;

displace at least a portion of the plurality of cache lines in the memory page to embed error correction code information for the cache line of data;

remap the displaced portion of the plurality of cache lines to another memory location at the top of a partial array to which the write request is directed; and write, to the memory device using the communication bus, the cache line of data and the error correction code information for the cache line of data to the memory page at a location to allow a common memory activation command to retrieve both the cache line of data and the error correction code information for the cache line of data, to thus reduce latency and power use.

16. The apparatus of claim 15, further comprising logic to remap error correction code information associated with the plurality of cache lines to another memory location.

17. The apparatus of claim 15, further comprising logic to:
receive a memory access request directed to the memory page, wherein the memory access request comprises a column address; and
apply a first mapping policy when a plurality of most significant bits in the column address all hold a value of one (1).

18. The apparatus of claim 17, further comprising logic to:
apply a second mapping policy when a plurality of most significant bits in the column address do not all hold a value of one (1).

19. The apparatus of claim 15, further comprising logic to cut power to at least one of the plurality of partial arrays, wherein each of the plurality of partial arrays includes an independent low power state.

20. The apparatus of claim 17, wherein:
the memory access request to access data on the memory device is a write request; and
the data and the error correction code information are stored on the same memory page.

21. The apparatus of claim 17, wherein:
the memory access request to access data on the memory device is a read request; and
the data and the error correction code information are retrieved from the same memory page.

22. The electronic device of claim 1, further comprising logic to utilize a common activation command for both the data and the error correction code information.

* * * * *